US012614772B2

(12) United States Patent　　　　(10) Patent No.:　US 12,614,772 B2

Hadler et al.　　　　　　　　　　　(45) Date of Patent:　Apr. 28, 2026

(54) BATTERY SYSTEM COMPRISING CYLINDRICAL CELLS AND A TEMPERATURE SENSOR AND METHOD OF INSTALLING THE SAME

(71) Applicant: SAMSUNG SDI CO., LTD., Yongin-si (KR)

(72) Inventors: Bernhard Hadler, Graz (AT); Markus Ridisser, Premstätten (AT)

(73) Assignee: Samsung SDI Co., Ltd., Yongin-si (KR)

( * ) Notice: Subject to any disclaimer, the term of this patent is extended or adjusted under 35 U.S.C. 154(b) by 669 days.

(21) Appl. No.: 17/969,304

(22) Filed: Oct. 19, 2022

(65) Prior Publication Data

US 2023/0130350 A1　　Apr. 27, 2023

(30) Foreign Application Priority Data

Oct. 21, 2021　(EP) ..................................... 21203840
Oct. 14, 2022　(KR) ........................ 10-2022-0132694

(51) Int. Cl.
　*H01M 10/48*　　　(2006.01)
　*H01M 50/213*　　(2021.01)
　*H01M 50/503*　　(2021.01)
(52) U.S. Cl.
　CPC ....... *H01M 10/486* (2013.01); *H01M 50/213* (2021.01); *H01M 50/503* (2021.01)
(58) Field of Classification Search
　CPC . H01M 10/486; H01M 50/503; H01M 50/213
　See application file for complete search history.

(56) References Cited

U.S. PATENT DOCUMENTS 6,410,184 B1　6/2002　Horiuchi et al.
9,373,832 B2　6/2016　Park et al.
　　　　　　　(Continued)

FOREIGN PATENT DOCUMENTS

CN　　110085946 A　*　8/2019　.......... H01M 10/613
CN　　113161594 A　　7/2021
　　　　　　　(Continued)

OTHER PUBLICATIONS

EPO machine generated English translation of KR-102029422-B1 (Year: 2019).*

(Continued)

*Primary Examiner* — Kimberly Wyluda
(74) *Attorney, Agent, or Firm* — Womble Bond Dickinson (US) LLP

(57) ABSTRACT

A battery system includes: a battery pack including a plurality of cylindrical battery cells arranged in an array with clearances between neighboring ones of the battery cells; an electrical conductor having a main portion extending along a surface of the battery pack and a branch portion branching off of the main portion; a temperature sensor on the branch portion of the electrical conductor and configured to sense a temperature of at least one of the battery cells; and a pin element. The branch portion with the temperature sensor thereon and the pin element extend into the same clearance such that the pin element presses the temperature sensor against the at least one of the battery cells.

15 Claims, 3 Drawing Sheets

(56)  References Cited

U.S. PATENT DOCUMENTS

| 2006/0028183 | A1 | 2/2006 | Izawa et al. |
| 2012/0251849 | A1 | 10/2012 | Park et al. |
| 2019/0296407 | A1 | 9/2019 | Newman et al. |
| 2020/0240848 | A1 | 7/2020 | Wienand et al. |
| 2021/0203029 | A1 | 7/2021 | Ahn |

FOREIGN PATENT DOCUMENTS

| DE | 202019103921 U1 | 9/2019 | |
| EP | 1 278 262 A1 | 1/2003 | |
| KR | 102029422 B1 * | 10/2019 | .......... H01M 10/653 |

OTHER PUBLICATIONS

EPO machine generated English translation of CN-110085946-A (Year: 2019).*

Chinese Office Action issued in corresponding CN Application No. 202211280108.1, dated Aug. 5, 2025, 9 pages.

Extended European Search Report issued in corresponding application No. EP 21203840.0, dated Mar. 31, 2022, 8 pages.

* cited by examiner

BATTERY SYSTEM COMPRISING CYLINDRICAL CELLS AND A TEMPERATURE SENSOR AND METHOD OF INSTALLING THE SAME

CROSS-REFERENCE TO RELATED APPLICATION

This application claims priority to and the benefit of European Patent Application No. 21203840.0, filed in the European Patent Office on Oct. 21, 2021, and Korean Patent Application No. 10-2022-0132694, filed in the Korean Intellectual Property Office on Oct. 14, 2022, the entire content of both of which are incorporated herein by reference.

BACKGROUND

1. Field

Aspects of embodiments of the present disclosure relate to a battery system including cylindrical battery cells and a temperature sensor and to a method for installing a temperature sensor in a battery pack.

2. Description of the Related Art

Recently, vehicles for transportation of goods and peoples have been developed that use electric power as a source for motion. Such an electric vehicle is an automobile that is propelled by an electric motor using energy stored in rechargeable batteries. An electric vehicle may be solely powered by batteries or may be a hybrid vehicle powered by, for example, a gasoline generator or a hydrogen fuel power cell. A hybrid vehicle may include a combination of electric motor and conventional combustion engine. Generally, an electric-vehicle battery (EVB or traction battery) is a battery used to power the propulsion of battery electric vehicles (BEVs). Electric-vehicle batteries differ from starting, lighting, and ignition batteries in that they are designed to provide power for sustained periods of time. A rechargeable (or secondary) battery differs from a primary battery in that it is designed to be repeatedly charged and discharged, while the latter is designed to provide an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for electric and hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, such as cylindrical or rectangular, may be selected based on the battery's intended purpose. Lithium-ion (and similar lithium polymer) batteries, widely known via their use in laptops and consumer electronics, dominate the most recent electric vehicles in development.

Rechargeable batteries may be used as a battery module formed of a plurality of unit battery cells coupled together in series and/or in parallel to provide a high energy content, such as for motor driving of a hybrid vehicle. The battery module may be formed by interconnecting the electrode terminals of the plurality of unit battery cells in a manner depending on a desired amount of power and to realize a high-power rechargeable battery.

Battery modules can be constructed either in a block design or in a modular design. In the block design, each battery is coupled to a common current collector structure and a common battery management system, and the unit thereof is arranged in a housing. In the modular design, pluralities of battery cells are connected together to form submodules, and several submodules are connected together to form the battery module. In automotive applications, battery systems generally include a plurality of battery modules connected together in series to provide a desired voltage. The battery modules may include submodules with a plurality of stacked battery cells, and each stack includes cells connected in parallel that are, in turn, connected in series (XpYs) or cells connected in series that are, in turn, connected in parallel (XsYp).

A battery pack is a set of any number of (usually identical) battery modules. The battery modules may be configured in series, parallel, or a mixture of both to deliver the desired voltage, capacity, and/or power density. Components of a battery pack include the individual battery modules and the interconnects, which provide electrical conductivity between the battery modules.

A battery system may further include a battery management system (BMS), which is an electronic system that manages the rechargeable battery, battery module, and battery pack, such as by protecting the batteries from operating outside their safe operating area (or safe operating parameters), monitoring their states, calculating secondary data, reporting that data, controlling its environment, authenticating it, and/or balancing it. For example, the BMS may monitor the state of the battery as represented by voltage (such as total voltage of the battery pack or battery modules, voltages of individual cells, etc.), temperature (such as average temperature of the battery pack or battery modules, coolant intake temperature, coolant output temperature, or temperatures of individual cells, etc.), coolant flow (such as flow rate, cooling liquid pressure, etc.), and current. Additionally, a BMS may calculate values based on the above items, such as minimum and maximum cell voltage, state of charge (SoC) or depth of discharge (DoD) to indicate the charge level of the battery, state of health (SoH; a variously-defined measurement of the remaining capacity of the battery as % of the original capacity), state of power (SoP; the amount of power available for a defined time interval given the current power usage, temperature, and other conditions), state of safety (SoS), maximum charge current as a charge current limit (CCL), maximum discharge current as a discharge current limit (DCL), and internal impedance of a cell (to determine open circuit voltage).

The BMS may be centralized such that a single controller is connected to the battery cells through a multitude of wires. The BMS may be also distributed, in which a BMS board is installed at each cell with just a single communication cable between the battery and a controller. Or the BMS may have a modular construction including a few controllers, each handling a certain number (e.g., a group or subset) of cells with communication between the controllers. Centralized BMSs are most economical but are least expandable and are plagued by a multitude of wires. Distributed BMSs are the most expensive but are simplest to install and offer the cleanest assembly. Modular BMSs offer a compromise of the features and problems of the other two topologies.

A BMS may protect the battery pack from operating outside its safe operating area. Operation outside the safe operating area may be indicated by over-current, over-voltage (e.g., during charging), over-temperature, under-temperature, over-pressure, and ground fault or leakage current detection. The BMS may prevent (or mitigate) operation outside the battery's safe operating area by including an internal switch, such as a relay or solid-state device, which opens if the battery is operated outside its safe operating area, by requesting the devices to which the battery is connected to reduce or even terminate using the battery, and by actively controlling the environment, such as through heaters, fans, air conditioning, or liquid cooling.

A thermal management system provides thermal control of the battery pack to safely use the battery module by efficiently emitting, discharging, and/or dissipating heat generated by its rechargeable batteries. If the heat emission/discharge/dissipation is not sufficiently performed, temperature deviations may occur between respective battery cells such that the battery module may no longer generate a desired amount of power. In addition, an increase of the internal temperature can lead to abnormal reactions occurring therein and, thus, charging and discharging performance of the rechargeable deteriorates and the life-span of the rechargeable battery is shortened.

SUMMARY

Aspects of embodiments of the present disclosure provide a less complex battery system, such as a battery system including a simple temperature sensor arrangement, and a less complex method of installing a temperature sensor in the battery system. The present disclosure is, however, defined by the appended claims and their equivalents. Any disclosure lying outside the scope of the claims and their equivalents is intended for illustrative as well as comparative purposes.

As embodiment of the present disclosure is directed to a battery system including a battery pack including a plurality of cylindrical battery cells arranged in an array with clearances between neighboring battery cells, an electrical conductor element (e.g., an electrical conductor) having a main portion extending along a surface of the battery pack and at least one branch portion branching off of the main portion, a temperature sensor configured to sense the temperature of at least one of the battery cells, the branch portion with the temperature sensor thereon extending into one of the clearances between the battery cells, and a pin element inserted into the same clearance such that it presses the temperature sensor against at least one of the battery cells.

Another embodiment of the present disclosure is directed to a method for installing a temperature sensor in a battery pack and includes: providing a battery pack including a plurality of cylindrical battery cells arranged in an array with clearances between neighboring battery cells; arranging a main portion of an electrical conductor element along a surface of the battery pack; inserting a branch portion of the electrical conductor element branching off of the main portion and including a temperature sensor configured to sense the temperature of at least one of the battery cells into one of the clearances between the battery cells; and inserting a pin element into the same clearance such that it presses the temperature sensor against the at least one of the battery cells.

Accordingly, the temperature sensor may be installed in the battery pack to achieve a battery system according to an embodiment of the present disclosure. In the following, embodiments of the battery system and as well as the method of manufacturing the same will be explained. Explanations given for the battery system apply to the method and vice versa.

The cylindrical battery cells are arranged in an array (e.g., in a regular fashion in rows and columns of cells), which is a space-saving arrangement for cylindrical cells. However, due to the cylindrical shape (or form) of the battery cells, clearances (or spaces) remain between neighboring cells, such as between cells in neighboring rows. For example, the battery pack may include multiple rows of cylindrical battery cells, with every second row being offset from the first rows by approximately half of the diameter of one of the cells. This way, a clearance is delimited (or formed) by three cells. The array may include more than two cells, such as at least three cells. According to embodiments of the present disclosure, at least one temperature sensor is inserted into at least one of such clearances. Multiple temperature sensors may be arranged inside one of the clearances, for example, at different depths. Also, multiple clearances may be provided with one or more temperature sensors.

According to embodiments of the present disclosure, the temperature sensor is connected to an electrical conductor element (e.g., an electrical conductor), and the electrical conductor element provides an electrical connection between the temperature sensor and, for example, a BMS so that the BMS can receive temperature values determined by the temperature sensor. This allows for a determination and monitoring of the internal temperature(s) of the battery pack. The temperature sensor is arranged at a branch portion of the electrical conductor element, and the branch portion branches off from a main portion of the electrical conductor element into one of the clearances. The main portion extends along a surface of the battery pack, or, in other words, along an end side of the battery cells. In a mounting position of the battery system inside an electric vehicle, the surface may be the upper surface of the battery pack (e.g., the top side of the cells in a gravitational direction). The electrical conductor element may also act as an electrical connection of one or more of the battery cells to the BMS. When installing the temperature sensor, the main portion of the electrical conductor element is placed on the surface of the battery pack. At the same time or successively, the branch portion with the temperature sensor may be inserted into the clearance, for example, the branch portion and the pin element may be inserted into one of the clearances between the battery cells at the same time. In one embodiment, the branch portion with the temperature sensor is inserted into the clearance via the pin element as will be explained in more detail below.

The branch portion the temperature sensor extends far enough into the clearance to allow for a meaningful temperature measurement. For example, the temperature sensor may be arranged at the branch portion such that the temperature sensor, in the inserted position, is arranged at or close to the hottest spot of the respective battery cell. The temperature sensor may be arranged at a free end of the branch portion. According to an embodiment, the pin element inserted into the clearance acts on the temperature sensor such that the pin element presses the temperature sensor against at least one of the cells that delimit the clearance. The temperature sensor is fixed in its position in the respective clearance via the pin element that presses the temperature sensor against the at least one of the battery cells. The pin element allows for simple and reliable fixation of the temperature sensor inside the clearance. Because the pin element presses the sensor against the outer cylindrical surface of the cell, sufficient heat transfer is achieved from the cell to the sensor. Thus, reliable temperature measurement may be performed.

The pin element may be a separate element (e.g., separate from the temperature sensor and also from the remaining parts of the battery system). The pin element may include (or may be made of) an electrically non-conductive material. The pin element is installed by inserting it into the clearance the temperature sensor arranged at the branch portion of the electrical conductor element is inserted into. The pin element may be inserted into the clearance after the branch portion with the temperature sensor has been inserted. In one embodiment, however, the branch portion with the temperature sensor is inserted into the clearance via the pin element. The pin element is configured to press the temperature sensor against at least one of the cells delimiting the clearance. For example, the pin element may be configured to be deformed, such as elastically deformed, by adjacent/neighboring battery cells when inserted into the clearance. This way, the pin element may press the temperature sensor against the at least one battery cell. The pin element may include a pin head and a pin insertion portion (e.g., a pin body) extending essentially vertically from the pin head. The pin insertion portion may be inserted into the clearance and to press the temperature sensor against the cell as described above.

The fixation of the temperature sensor in the clearance via the pin element is simple because no further elements, such as an adhesive that needs to be cured, is necessary. Nevertheless, a reliable or even improved temperature measurement may be achieved because the pin element presses the temperature sensor against at least one of the cells whose temperature is to be measured.

The installation of the temperature sensor is simple because, according to an embodiment of the present disclosure, when inserting the pin element into the clearance, the pin element guides the branch portion and, therefore, the temperature sensor into the clearance. Thus, via insertion of the pin element, the at least one branch portion is inserted into the clearance along with the temperature sensor. In other words, the pin element pushes the branch portion and, thus, the temperature sensor into the clearance. Thus, the pin element may be configured to guide the branch portion into the clearance when the pin element is inserted into the clearance. According to an embodiment of the present disclosure, the pin element may include a guiding surface for guiding the branch portion into the clearance when the pin element is inserted into the clearance. When inserting the pin element, the guiding surface may act as a driver taking the branch portion and, therefore, the temperature sensor along into the clearance. The guiding surface may be formed to correspond to the branch portion; for example, it may have the same width. This allows for a simple installation because the insertion of the temperature sensor and the fixation of the same may be achieved in a single step.

According to another embodiment of the present disclosure, the pin element guides the branch portion into the clearance by bending the branch portion from an initial position, in which the branch portion is arranged parallel to the main portion, to a branched off position, in which the branch portion is branched off of the main portion. Accordingly, the branch portion may be bent by the pin element from the initial position to the branched off position. In the branched off position, the branch portion is no longer arranged parallel to the main portion but rather is inclined thereto at, for example, an angle of about 90 degrees. Thus, in other words, the pin element may branch off the branch portion of the electrical conductor element from the main portion of the electrical conductor element and may take the branch portion along with the temperature sensor on its way into the clearance. Therefore, when arranging the main portion along the surface of the battery pack, the branch portion may, according to this embodiment, be arranged along the surface of the battery pack as well. Subsequently, the branch portion is branched off/bent by the pin element and inserted into the clearance. This is particularly simple because it simplifies the electrical conductor element.

According to another embodiment of the present disclosure, the electrical conductor element is a flexible electrical conductor element, such as a flexible flat cable (FFC), including a plurality of isolated conducting lines. In such an embodiment, the branch portion may be formed by at least two of the isolated conducting lines that are connected to the temperature sensor. The main portion may be formed by the remaining conducting lines of the plurality of isolated conducting lines. Thus, the electrical conductor element may be a flexible flat cable that is arranged at the surface of the battery pack and includes one or more temperature sensors and connects these temperature sensors to a BMS. When inserting the pin element(s), the conducting lines supplying (e.g., connected to) the respective temperature sensors may be separated by the pin element from the remaining conducting lines so that the branch portion is branched off of the main portion and the branch portion with the temperature sensor being inserted into the clearance via the pin element.

According to another embodiment of the present disclosure, the pin element includes a pin head that fixes the electrical conductor element, such as the main portion of the electrical conductor element, to the surface of the battery pack/battery cells. As described above, the pin element may include a pin head and a pin insertion portion extending essentially vertically from the pin head. The pin insertion portion is inserted into the clearance and presses the temperature sensor against the battery cell as described. The pin head may hold the main portion, which is arranged at the surface of the battery pack, by pressing the main portion in a planar manner against the surface of the battery pack. Thus, the pin element may not only fix the branch portion inside the clearance but also fix the main portion. Such a pin element is particularly efficient and simplifies the installation. For example, any further fixation of the electrical conductor element may be omitted.

According to another embodiment of the present disclosure, the pin element includes (or is made of) plastic so as to be non-conductive. The complete pin element, that is, the pin head and the pin insertion portion, may include (or may be of) a plastic material.

According to another embodiment of the present disclosure, the pin element is deformed by the neighboring battery cells delimiting the clearance. For example, the pin element may be elastically deformed. As the pin element is deformed, it presses the temperature sensor against at least one of the adjacent battery cells that delimit the clearance. According to embodiments of the present disclosure, the pin element includes elastic ribs that are orthogonally arranged to a longitudinal extension of the pin element. The elastic ribs are configured to be deformed (e.g., elastically deformed) by neighboring battery cells when the pin element is inserted into the clearance. The elastic rips are arranged successively along the longitudinal extension of the pin element (e.g., along the pin insertion portion). When inserting the pin element, the elastic rips may be deformed by the neighboring cells defining the clearance the pin is inserted into, such that the pin element contacts all of the neighboring cells. Such a pin element may be a so-called a pine tree pin. Such a pin element may hold the branch portion and the temperature sensor securely in the clearance.

According to another embodiment of the present disclosure, the branch portion extends into the clearance far enough such that the temperature sensor is positioned approximately at half of the length of the cylindrical axis of the battery cell it is pressed against. Thus, the temperature sensor is arranged approximately at the middle of the battery cell with respect to its longitudinal extension, which is usually the hottest spot of the cell.

Embodiments of the present disclosure pertain to an electric vehicle including a battery system as explained above.

Further aspects and features of the present disclosure can be learned from the dependent claims and/or the following description.

BRIEF DESCRIPTION OF THE DRAWINGS

Aspects and features of the present disclosure will become apparent to those of ordinary skill in the art by describing, in detail, embodiments thereof with reference to the attached drawings, in which.

DETAILED DESCRIPTION

Figure 1A:
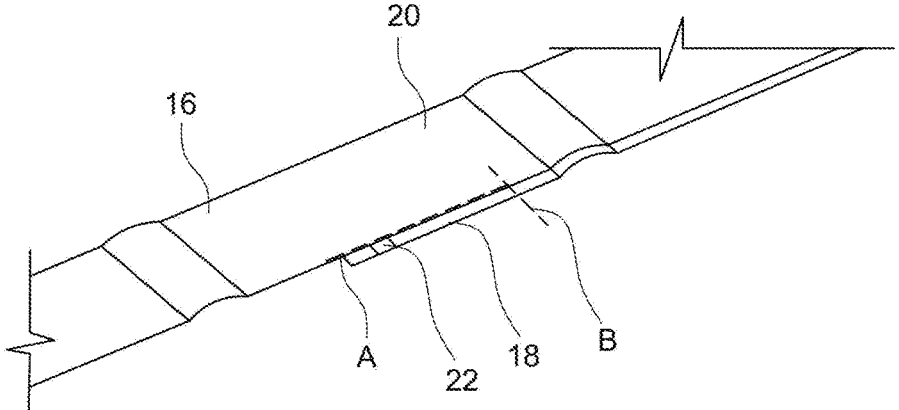
FIGS. 1A and 1B are schematic perspective views of an electrical conductor element of a battery system according to an embodiment.

Reference will now be made, in detail, to embodiments, examples of which are illustrated in the accompanying drawings. Aspects and features of the embodiments, and implementation methods thereof, will be described with reference to the accompanying drawings. In the drawings, like reference numerals denote like elements, and redundant descriptions thereof may be omitted. And the relative sizes of elements, layers, and regions may be exaggerated for clarity.

The present disclosure, however, may be embodied in various different forms and should not be construed as being limited to the embodiments illustrated herein. Rather, these embodiments are provided as examples so that this disclosure will be thorough and complete, and will fully convey the aspects and features of the present disclosure to those skilled in the art.

Processes, elements, and techniques that are not considered necessary to those having ordinary skill in the art to have a complete understanding of the aspects and features of the present disclosure may not be described.

The use of "may" when describing embodiments of the present disclosure refers to "one or more embodiments of the present disclosure." In the following and the above description of embodiments of the present disclosure, the terms of a singular form may include plural forms unless the context clearly indicates otherwise. Expressions such as "at least one of," when preceding a list of elements, modify the entire list of elements and do not modify the individual elements of the list. As used herein, the term "substantially," "about," and similar terms are used as terms of approximation and not as terms of degree and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

It will be further understood that the terms "have" "include," "comprise," "having," "including," or "comprising" specify a property, a region, a fixed number, a step, a process, an element, a component, or a combination thereof but do not exclude other properties, regions, fixed numbers, steps, processes, elements, components, or combinations thereof. It will also be understood that when a film, a region, or an element is referred to as being "above" or "on" another film, region, or element, it can be directly on the other film, region, or element, or intervening films, regions, or elements may also be present.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As used herein, the terms "use," "using," and "used" may be considered synonymous with the terms "utilize," "utilizing," and "utilized," respectively. It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

Figure 1B:
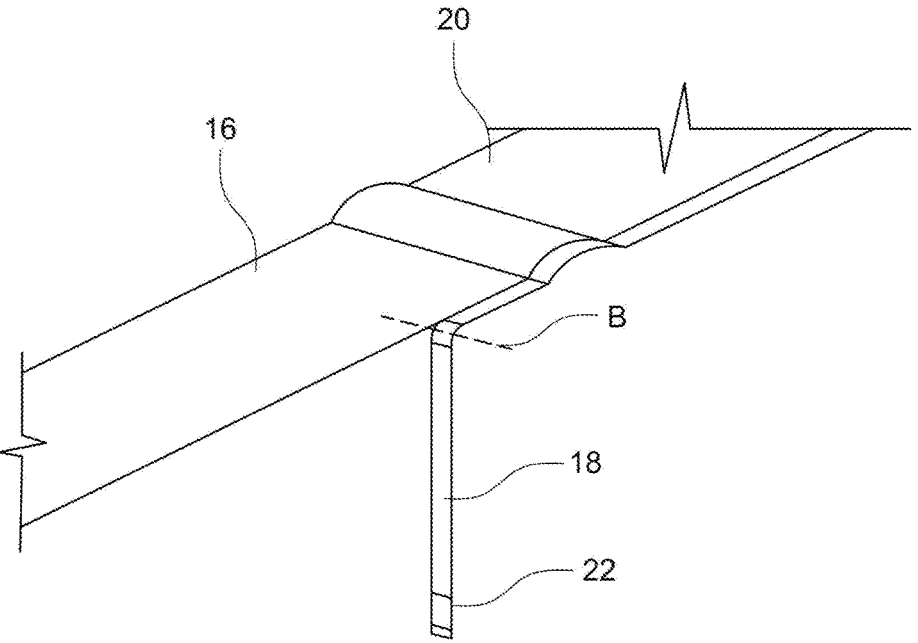

FIGS. 1A and 1B are schematic perspective views of an electrical conductor element 20, which in the illustrated embodiment, is a flexible flat cable (FFC) and includes a plurality of isolated conducting lines jointly set in an isolation material. The electrical conductor element 20 has a main portion 16 and at least one branch portion 18. The branch portion 18 is formed by at least two of the isolated conducting lines that are connected to a temperature sensor 22, which is arranged at a free end of the branch portion 18.

FIG. 1A shows the branch portion 18 of the electrical conductor element 20 in an initial position before the temperature sensor 22 is installed at a battery pack. In this initial position, the branch portion 18 is arranged parallel to the main portion 16. FIG. 1B shows the branch portion 18 in a branched off position in which the branch portion 18 is branched off of the main portion 16 and extends essentially vertically downwardly from the main portion 16. To achieve the branched off position, the branch portion 18 is parted from the main portion 16 along a parting line A (see, e.g., FIG. 1A) and is bent downwardly approximately 90 degrees about a bending line B. By branching off the branch portion 18, the two conducting lines of the branch portion 18 are separated from the main portion 16 by ripping apart the joint isolation along the parting line A.

Figure 2A:
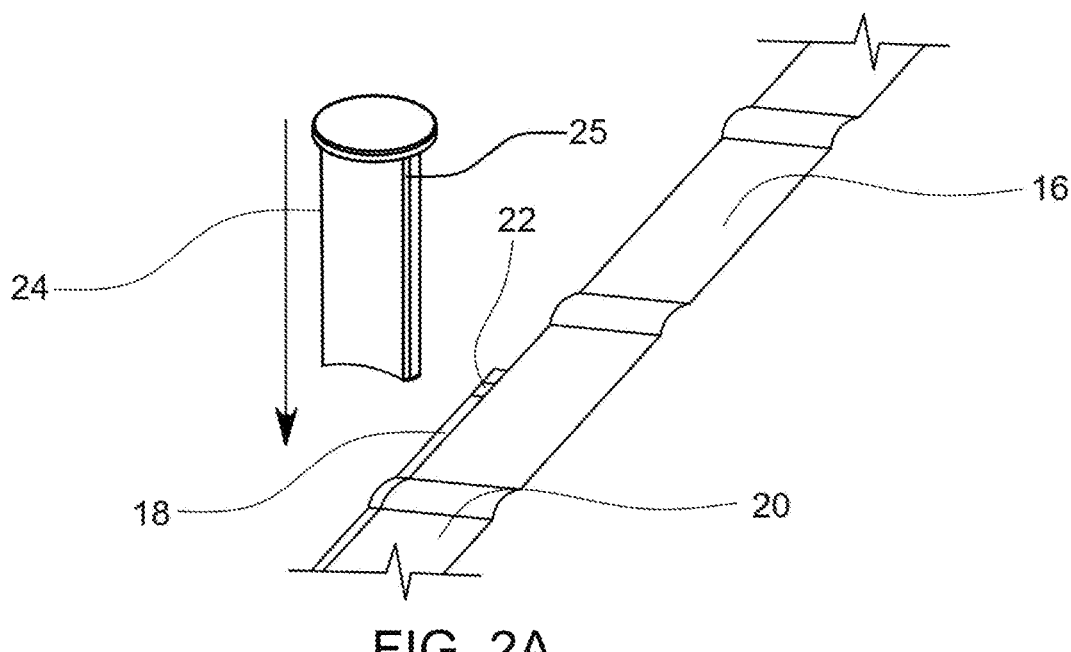
FIGS. 2A-2C are schematic perspective views of the electrical conductor element shown in FIG. 1 with a pin element and a battery pack.
Figure 2B:
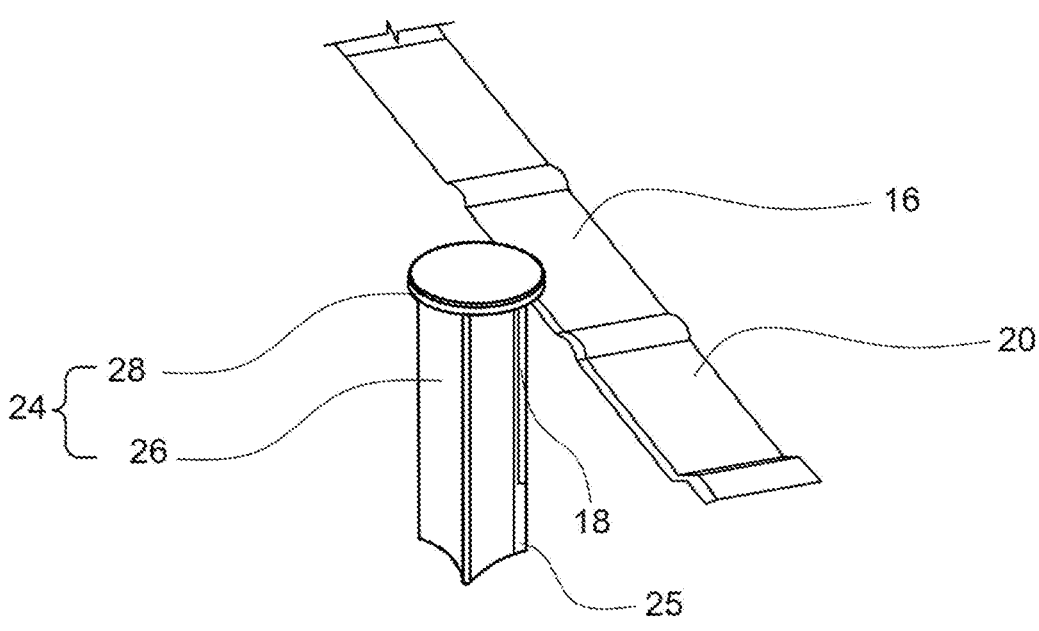
Figure 2C:
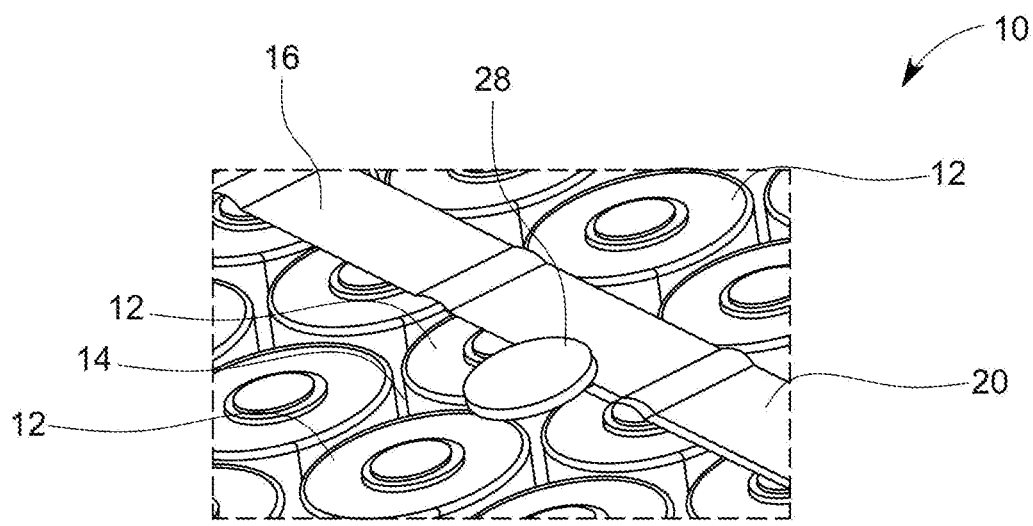

The branch portion 18 is moved from the initial position to the branched off position via a pin element 24 as can be seen in, for example, FIGS. 2A and 2B. First, the electrical conductor element 20 is arranged at an upper surface of a battery pack 10, for example, at a top side of cylindrical battery cells 12 as shown in FIG. 2C. The branch portion 18 is, at first, in the above-described initial position as shown in, for example, FIG. 2A. Next, the pin element 24, which includes a pin head 28 and a pin insertion portion (e.g. a pin body) 26, is inserted into a clearance (e.g., a space) 14 between neighboring battery cells 12 from among the plurality of cylindrical battery cells 12. The pin element 24 separates the branch portion 18 from the main portion 16 of the electrical conductor element 20 and, via a guiding surface 25, takes the branch portion 18 and, thus, the temperature sensor 22 attached thereto, into the clearance 14. In the branched off position, as shown in, for example, FIGS. 2B and 2C, the branch portion 18 is bent downwardly from the main portion 16 and the temperature sensor 22 is pressed by the pin insertion portion 26 of the pin element 24 against one of the battery cells 12.

The pin element 24 provides simple and reliable fixation of the temperature sensor 22 inside the clearance 14. For example, no further elements, such as an adhesive, are necessary. Because the pin element 24 presses the temperature sensor 22 against the outer cylindrical surface of one of the battery cells 12, sufficient heat transfer is achieved from the battery cell 12 to the temperature sensor 22. Thus, temperature measurement may be reliably performed. The length of the branch portion 18 and the arrangement of the temperature sensor 22 on the branch portion 18 may be varied so that the temperature sensor 22 extends far enough down into the clearance to be close to the hottest spot of the battery cell 12 it is pressed against. For example, the branch portion 18 may extend in the clearance 14 far enough such that the temperature sensor 22 is positioned approximately at half of the length of the cylindrical axis of the battery cell 12. A meaningful temperature can be measured at such a position.

Furthermore, the inserted pin element 24, via its pin head 28, fixes the electrical conductor element 20, such as the main portion 16, to the surface of the battery pack 10 (e.g., to the upper side of the battery cells 12) by holding/pressing the main portion 16 against the upper side/surface as can be seen in, for example FIG. 2C. Thus, the pin element 24 may fix not only for the branch portion 18 and, thus, the temperature sensor 22 inside the clearance but also the main portion 16 on top of the battery cells 12.

Figure 3:
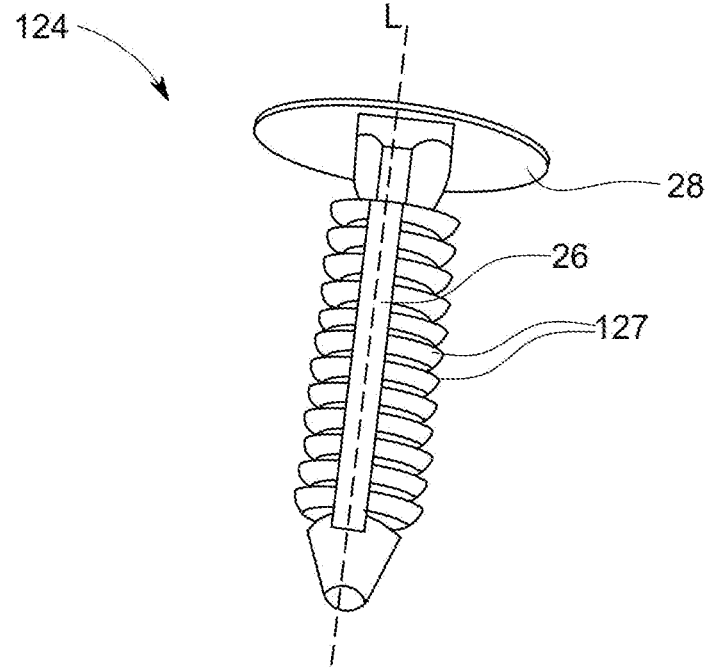
FIG. 3 is a schematic view of a pin element according to another embodiment.

FIG. 3 shows another embodiment of a pin element 124, which may be used in the battery system described above in place of the pin element 24.

The pin element 124 includes elastic ribs 127 arranged successively along the longitudinal extension L of the pin element 124 (e.g., along the pin insertion portion 26). The elastic ribs 127 extend orthogonally outwardly from the pin insertion portion 26 and are configured to elastically deform on contact with neighboring battery cells 12 when the pin element 124 is inserted into the clearance 14. The pin element 124 may also be called a pine tree pin. The pin element 124 may securely hold the branch portion 18 and the temperature sensor 22 in the clearance 14.

SOME REFERENCE NUMERALS

10 battery pack
12 cylindrical battery cells
14 clearance(s)
16 main portion of electrical conductor element
18 branch portion of electrical conductor element
20 electrical conductor element
22 temperature sensor
24 pin element
25 guiding surface of pin element
26 pin insertion portion of pin element
28 pin head of pin element
124 pin element
127 elastic ribs
A parting line
B bending line
L longitudinal extension

What is claimed is:

1. A battery system comprising:
a battery pack comprising a plurality of cylindrical battery cells arranged in an array with clearances between neighboring ones of the battery cells;
an electrical conductor having a main portion extending along a surface of the battery pack and a branch portion branching off of the main portion;
a temperature sensor on the branch portion of the electrical conductor and configured to sense a temperature of at least one of the battery cells; and
a pin element,
wherein the branch portion with the temperature sensor thereon and the pin element extend into the same clearance such that the pin element presses the temperature sensor against the at least one of the battery cells.

2. The battery system according to claim 1, wherein the branch portion is configured to be bent by the pin element from an initial position, in which the branch portion is parallel to the main portion, to a branched off position, in which the branch portion is branched off of the main portion into the clearance.

3. The battery system according to claim 1, wherein the pin element is configured to guide the branch portion into the clearance when the pin element is inserted into the clearance.

4. The battery system according to claim 3, wherein the pin element has a guiding surface configured to guide the branch portion into the clearance when the pin element is inserted into the clearance.

5. The battery system according to claim 1, wherein the electrical conductor is a flexible electrical conductor comprising a plurality of isolated conducting lines, and
  wherein the branch portion is formed by at least two of the isolated conducting lines that are connected to the temperature sensor.

6. The battery system according to claim 5, wherein the electrical conductor is a flexible flat cable.

7. The battery system according to claim 1, wherein the pin element comprises a pin head that fixes the electrical conductor to the surface of the battery pack.

8. The battery system according to claim 7, wherein the pin element comprises plastic.

9. The battery system according to claim 1, wherein the pin element is deformed by the neighboring ones of the battery cells forming the clearance when the pin element is in the clearance.

10. The battery system according to claim 9, wherein the pin element comprises elastic ribs that are orthogonally arranged with respect to a longitudinal extension of the pin element, and
  wherein the elastic ribs are deformed by the neighboring ones of the battery cells when the pin element is inserted into the clearance.

11. The battery system according to claim 1, wherein the branch portion extends into the clearance far enough that the temperature sensor is at half of a length of a cylindrical axis of the at least one of the battery cells it contacts.

12. An electric vehicle comprising the battery system according to claim 1.

13. A method for installing a temperature sensor in a battery pack, the battery pack comprising a plurality of cylindrical battery cells arranged in an array with clearances between neighboring ones of the battery cells, the method comprising:
  arranging a main portion of an electrical conductor along a surface of the battery pack;
  inserting a branch portion of the electrical conductor that branches off of the main portion and comprises a temperature sensor configured to sense a temperature of one of the battery cells into one of the clearances; and
  inserting a pin element into the one of the clearances such that the pin element presses the temperature sensor against the one of the battery cells.

14. The method according to claim 13, wherein, during the inserting of the pin element into the one of the clearances, the pin element guides the branch portion and the temperature sensor into the one of the clearances.

15. The method according to claim 14, wherein the pin element guides the branch portion into the one of the clearances by bending the branch portion from an initial position, in which the branch portion is parallel to the main portion, to a branched off position, in which the branch portion is branched off the main portion.

\* \* \* \* \*